United States Patent
Lee et al.

(10) Patent No.: US 9,344,516 B2
(45) Date of Patent: May 17, 2016

(54) INTERLOCKING APPLICATIONS AND FILES

(71) Applicant: Zentera Systems, Inc., San Jose, CA (US)

(72) Inventors: Jaushin Lee, Saratoga, CA (US); Junwei Wu, Taipei (TW); Wei-Chin Chu, Taipei (TW)

(73) Assignee: Zentera Systems, Inc., San Jose, CA (US)

( * ) Notice: Subject to any disclaimer, the term of this patent is extended or adjusted under 35 U.S.C. 154(b) by 57 days.

(21) Appl. No.: 14/290,827

(22) Filed: May 29, 2014

(65) Prior Publication Data
US 2014/0359283 A1  Dec. 4, 2014

Related U.S. Application Data

(60) Provisional application No. 61/828,698, filed on May 30, 2013.

(51) Int. Cl.
*H04L 29/06* (2006.01)
*H04L 29/08* (2006.01)
*G06F 9/455* (2006.01)
*G06F 21/62* (2013.01)

(52) U.S. Cl.
CPC ........ *H04L 67/2852* (2013.01); *G06F 9/45533* (2013.01); *G06F 21/6209* (2013.01); *H04L 67/1097* (2013.01)

(58) Field of Classification Search
CPC ............ G06F 21/6209; G06F 9/45533; H04L 67/1097; H04L 67/2852
USPC ......................................................... 713/165
See application file for complete search history.

(56) References Cited

U.S. PATENT DOCUMENTS

| | | | |
|---|---|---|---|
| 2008/0165957 A1* | 7/2008 | Kandasamy | G06F 21/6218 380/44 |
| 2012/0124566 A1* | 5/2012 | Federighi | G06F 8/61 717/164 |

* cited by examiner

*Primary Examiner* — Kambiz Zand
*Assistant Examiner* — Abiy Getachew
(74) *Attorney, Agent, or Firm* — Staniford Tomita LLP

(57) ABSTRACT

A file system monitoring layer is positioned between a virtual file system (VFS) encryption layer and a lower level file system layer. The file system monitoring layer stores a list of applications that are allowed to access encrypted files stored in the lower level file system. The monitoring layer receives from the VFS encryption layer a request by an application to access an encrypted file. If the application is not listed on the list, the VFS encryption layer is instructed to provide the application a denial of service. If the application is listed, the VFS encryption layer is instructed to decrypt the encrypted file for the application.

26 Claims, 12 Drawing Sheets

INTERLOCKING APPLICATIONS AND FILES

CROSS-REFERENCE TO RELATED APPLICATIONS

This patent application claims priority to U.S. provisional patent application 61/828,698, filed May 30, 2013, and incorporates by reference U.S. patent application Ser. No. 14/187,091, filed Feb. 21, 2014; and U.S. patent application Ser. No. 14/190,019, filed Feb. 25, 2014.

BACKGROUND

The present invention relates to the field of information technology, including, more particularly, to systems and techniques for cloud computing.

Enterprise cloud computing is becoming inevitable. Market analysts have pointed out that more than 15 percent of total information technology (IT) spending worldwide will be on a public cloud by 2016. And, most enterprise public cloud computing infrastructures will have some kind of hybrid flavor with some private computing environments. While the technology for cloud orchestration for computing and storage resources is advancing rapidly, the technology that is required to support enterprise data transport, synchronization, backup, and security protection in the hybrid cloud is lacking behind. Common challenges and requirements facing enterprises are listed below.

Cloud servers in a public cloud are dynamically generated and deleted on demand. The data storage in a cloud can be a central storage or a local storage on each cloud server. For a secure data transfer system to work with the central storage or local storage it is desirable that the system accommodates dynamically generated components of the cloud elastic computing infrastructure.

Data with frequent revisions may need to be transferred to a public cloud for processing by cloud servers, as part of the total automation. Due to the limited network bandwidth on the Internet, it is desirable to transfer only the delta between versions instead of transporting the entire volume. A data synchronization scheme is therefore desirable for a secure data transfer system. This synchronization scheme should accommodate the requirements for elastic computing.

New data can be generated in the cloud that needs to be backed up or feed forward to another remote system frequently for the next step in an intelligent analysis (for example, big data analysis). An automatic backup function is also a desirable feature for a secure data transfer system. The backup system should integrate with synchronization capability for data efficiency. Likewise, this backup function should accommodate the requirement for elastic computing as well.

Current cloud technology fails to address the above requirements—especially in the context of supporting an enterprise hybrid computing application. There is a need to provide improved systems and techniques to facilitate secure data transfer and access in enterprise cloud computing environments.

BRIEF SUMMARY OF THE INVENTION

A file system monitoring layer is positioned between a virtual file system (VFS) encryption layer and a lower level file system layer. The file system monitoring layer stores a list of applications that are allowed to access encrypted files stored in the lower level file system. The monitoring layer receives from the VFS encryption layer a request by an application to access an encrypted file. If the application is not listed on the list, the VFS encryption layer is instructed to provide the application a denial of service. If the application is listed, the VFS encryption layer is instructed to decrypt the encrypted file for the application.

In another specific embodiment, a file system monitoring layer is positioned between a virtual file system (VFS) encryption layer and a lower level file system layer. The file system monitoring layer stores a list of applications that are allowed to access encrypted files stored in the lower level file system. The applications can include but are not limited to applications software, end-user programs (e.g., word processors, text editors, or electronic design automation (EDA) software), systems software, executable software, scripts. Java scripts, operating system (OS) commands, utility programs, programming tools, code components, macros, computer programs, applets, firmware, plugins, extensions, and the like. The monitoring layer receives from the VFS encryption layer a request by an application to access an encrypted file. If the application is not listed on the list, the VFS encryption layer is instructed to provide the application with a denial of service. If the application is listed, the VFS encryption layer is instructed to decrypt the encrypted file for the application.

In a specific embodiment, a method includes storing a list including one or more identifiers for one or more applications that will be allowed to access an encrypted file, receiving from a virtual file system encryption layer a request by an application to access the encrypted file, determining whether an identifier for the application matches the one or more identifiers in the list, and if the identifier does match, instructing the virtual file system encryption layer to decrypt the encrypted file for the application.

The method may include if the identifier does not match, instructing the virtual file system encryption layer to provide a denial of service to the application. The application may be executing in a layer above the virtual file system encryption layer. The encrypted file may be stored on a virtual disk. The one or more identifiers may include a checksum. The encrypted file may include an executable file, or a data file.

In another specific embodiment, a method includes providing a file system monitoring layer between a virtual file system encryption layer and a base file system layer, the file system monitoring layer including a list identifying computer programs that will be allowed to access encrypted data stored in the base file system layer, receiving from the virtual file system encryption layer a request by a computer program to access the encrypted data, determining whether the computer program is listed in the list, and if the computer program is listed, instructing the virtual file system encryption layer to decrypt the data for the computer program.

The method may include if the computer program is not listed, instructing the virtual file system encryption layer to deny access to the encrypted data. The encrypted data may include an executable file or a data file. The file system monitoring layer may be in a kernel space. The computer program may include application software or system software.

In another specific embodiment, a method includes providing a file system monitoring layer between a virtual file system encryption layer and a base file system layer, the file system monitoring layer including a list identifying computer software that will be allowed to access data stored in an encrypted format in the base file system layer, receiving from the virtual file system encryption layer a request by a piece of computer software to access the data stored in the encrypted format, determining whether the piece of computer software is listed in the list, and if the piece of computer software is listed, instructing the virtual file system encryption layer to decrypt the data.

The method may include if the piece of computer software is not listed, instructing the virtual file system encryption layer to deny access to the data. The data may include an executable file, or a non-executable file. The file system monitoring layer may be in a kernel space.

In a specific embodiment, the data is in a cloud environment provided by a cloud services provider, and the method further includes storing an identifier of a particular cloud services provider, and before the instructing the virtual file system encryption layer to decrypt the data, determining that the identifier of the particular cloud services provider matches an identifier of the cloud services provider.

Other objects, features, and advantages will become apparent upon consideration of the following detailed description and the accompanying drawings, in which like reference designations represent like features throughout the figures.

DETAILED DESCRIPTION

Figure 1:
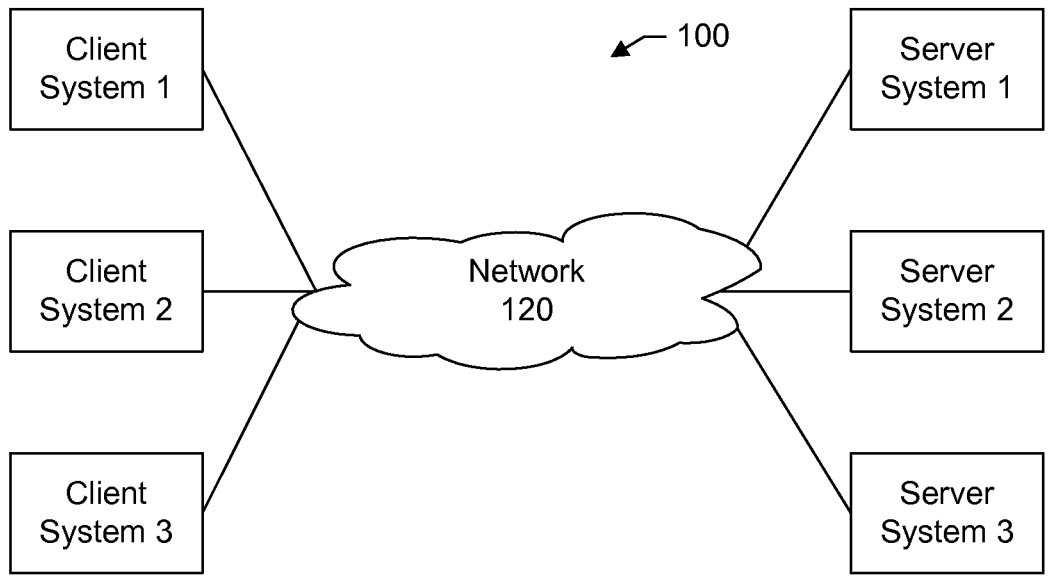
FIG. 1 shows a computer network system within which the present system may be embodied.

FIG. 1 shows a computer network system 100 within which the present system may be embodied. There may be any number of servers and clients in the system. For example, there may be hundreds, thousands, or even millions of servers and clients. In this system, there are three servers, server 1, server 2, and server 3, and there are three clients, client 1, client 2, and client 3. The client and server can represent application software. The hardware machine can be but is not limited to a server host machine or any type of client hardware machines such as desktop PC, laptop, and mobile devices. The servers communicate with the clients by exchanging packets over a network 120. The computer network system is representative of many different environments including a LAN (local area network) system, a wide area network (WAN) system, an Internet system. Ethernet, computer network, intranet, cellular phone network, or other.

Distributed computer network 100 in FIG. 1 is merely illustrative of an embodiment. One of ordinary skill in the art would recognize other variations, modifications, and alternatives. Client systems typically request information from server systems which provides the information. For this reason, server systems typically have more computing and storage capacity than client systems. However, a particular computer system may act as both a client or a server depending on whether the computer system is requesting or providing information.

Additionally, although some aspects of the system are described using a client-server environment or client-server application program, it should be apparent that the system may also be embodied in any environment where one system communicates with another system over a network. For example, in a hybrid cloud environment, there can be servers implementing the "client software" and other servers implementing the "server software." Those servers communicate with each other across cloud domains. The communication can be facilitated via a virtual network platform as discussed in this patent application.

As another example, there can be an access application where a "client machine" for a user is accessing servers in the "cloud." In this case, using GDB (GNU Debugger) as an example, the client software is then running on the client user machine. This client GDB software may to connect to the server GDB software that is running on the "server" in the cloud. The connection can be facilitated via a virtual network platform as discussed in this patent application.

A network generally includes: (1) at least two computers, (2) a network interface or network interface card (NIC) on each computer, (3) a connection medium, and (4) network operating system software. The NIC is a device that lets the computer talk to the network. The connection medium is usually a wire or cable, although wireless communication between networked computers and peripherals is also available. Some examples of network operating systems software include Microsoft Windows 7 or Windows Server 2012, Linux Red Hat 5, Ubuntu 13, Novell NetWare, AppleShare, or Artisoft LANtastic.

A network may include a hub, switch, or router. Hubs interconnect groups of users. Hubs can forward data packets—including e-mail, word-processing documents, spreadsheets, graphics, print requests—they receive over one port from one workstation to all their remaining ports.

Switches can offer more dedicated bandwidth to users or groups of servers. A switch can forward a data packet only to the appropriate port for the intended recipient, based on information in each packet header. To insulate the transmission from the other ports, the switch establishes a temporary connection between the source and destination, and then terminates the connection when the conversation is done.

A router links a local network to a remote network. On the internet, a router is a device or, in some cases, software in a computer, that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch.

Figure 2:
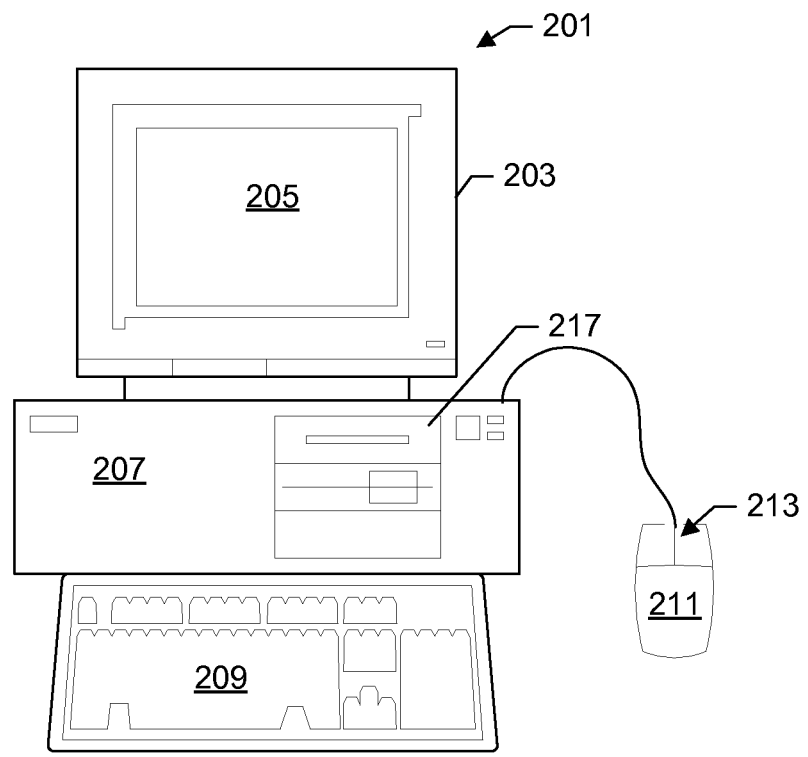
FIG. 2 shows a more detailed diagram of an example of a client or computer which may be used in an embodiment of the system.

FIG. 2 shows an example of a client or server system that may be used to execute software of the present system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g. DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
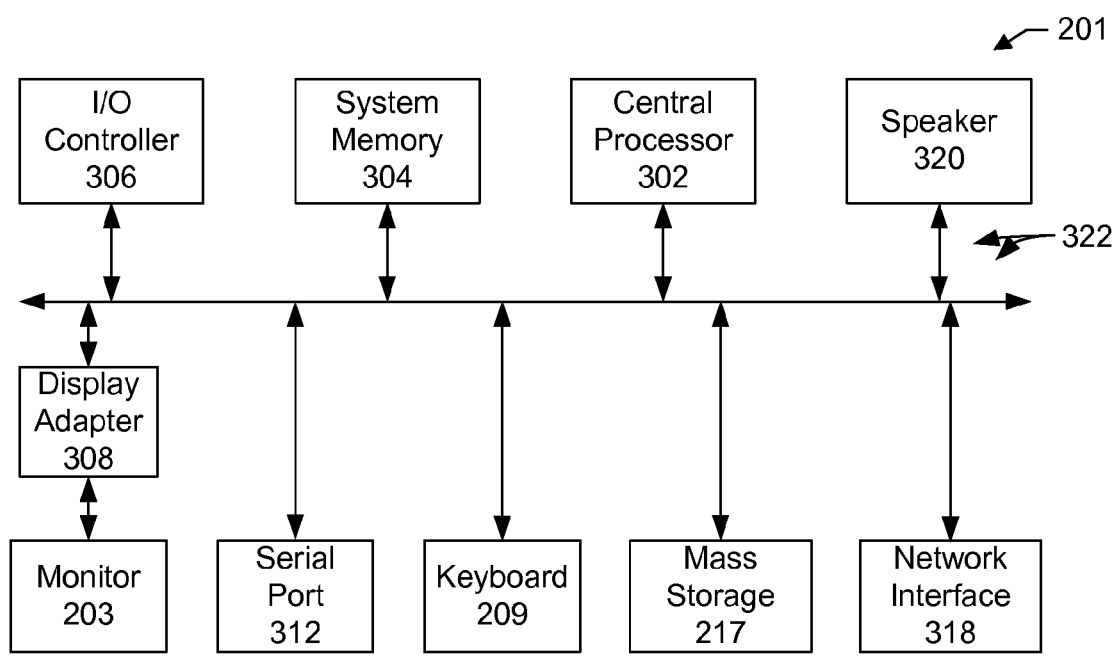
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e. a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran. Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, a computer program product is provided which stores instructions such as computer code to program a computer to perform any of the processes or techniques described.

An operating system for the system may be one of the Microsoft Windows® family of operating systems (e.g., Windows Server 2008, 2012, Windows NT®. Windows 2000®. Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
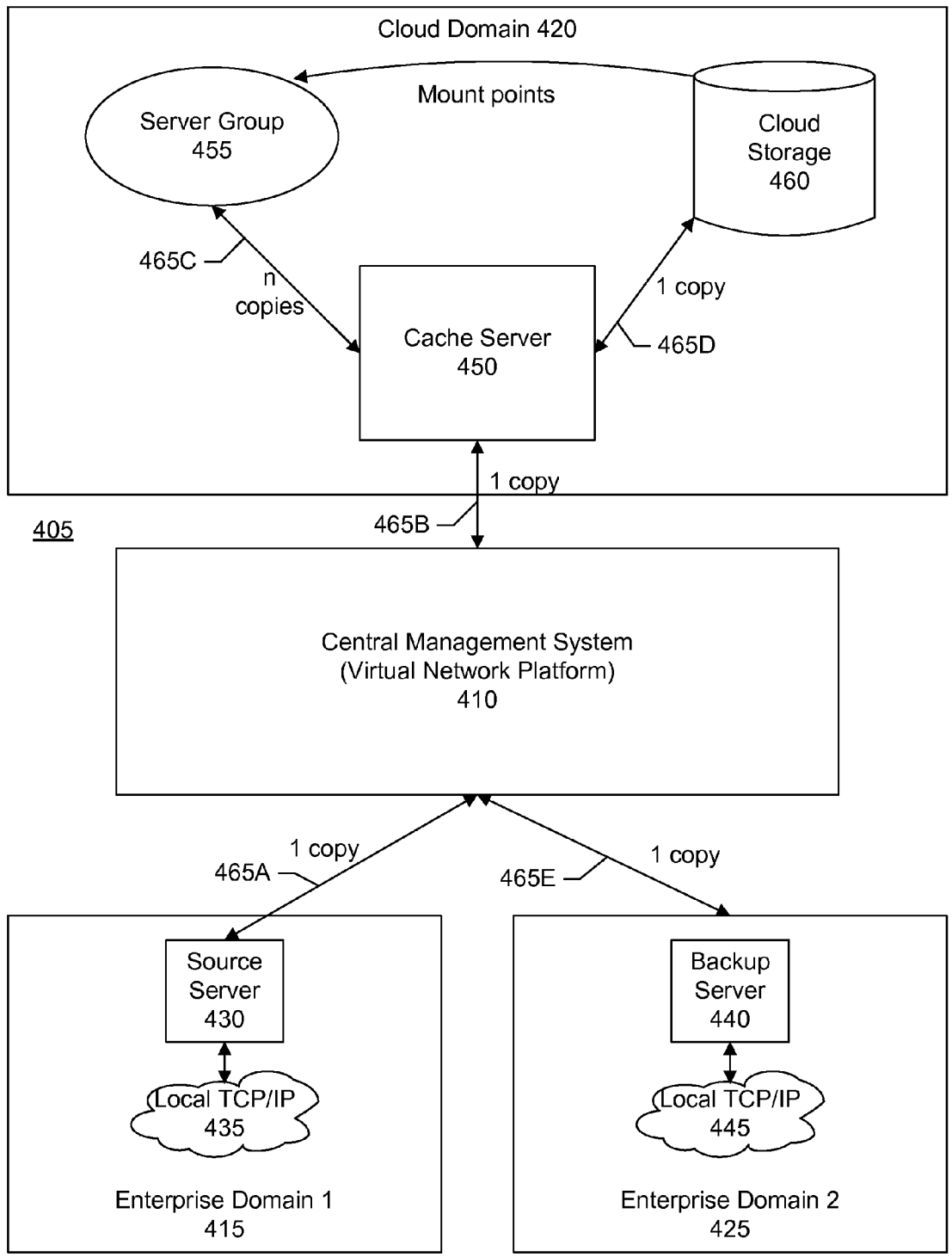
FIG. 4 shows a system architecture for a specific embodiment of a secure data transfer platform.

FIG. 4 shows a simplified block diagram of a specific embodiment of a system architecture for a secure data transfer platform. This secure data transfer platform allows enterprises to dynamically transfer, synchronize, backup and protect their data to and from an Infrastructure as a Service (IaaS) public cloud securely. The following sections provide a discussion of the system architecture, central management system (also referred to as a virtual network platform or fabric), file systems and synchronization scheme, data encryption and security key management, and application interlock.

System Architecture

In this specific embodiment, a system architecture 405 for the secure data transfer platform includes a central management system 410 that connects a first enterprise network domain 415 with one or more cloud domains 420 provided by cloud services providers. In this specific embodiment, the central management system also connects a second enterprise network domain or a cloud domain 425 to first domain 415 and cloud domain 420. It should be appreciated that the central management system can interconnect any number of domains including physical network domains, cloud domains, or combinations of these (e.g., connect a physical network domain to another physical network domain; connect a cloud domain to another cloud domain; connect two physical network domains and a cloud domain; connect two physical network domains and two cloud domains; connect three physical network domains and four cloud domains; and so forth).

The central management system may be referred to as a virtual network platform or virtual hybrid infrastructure or virtual cloud fabric. The first and second domains may belong to the same or different enterprise. The first network domain may be different, separate, or remote from the second network domain. For example, the domains may be in different physical or geographic locations, have different capabilities, have different computer architectures, have different network environments, have different physical devices, networking infrastructure may be owned, operated, and administered by different entities, companies, enterprises, authorities, parties, or organizations, have different administrative policies, have different storage policies, have different security policies, or combinations of these.

A domain can include any number of end points such as servers that are interconnected themselves through a local network (e.g., local TCP/IP network). These servers can function as a data source, data destination, or both. For example, a server may function as a source of data where the data is to be transferred (e.g., moved or copied) to a cloud domain, another enterprise domain, or both. A server in one domain may function as a destination or target of data where the data is to be received from another domain such as for backup purposes or further analysis.

In the example shown in FIG. 4, the first enterprise domain includes a source server 430. The source server is connected via the central management system to the cloud domain and second enterprise domain. The source server may itself be interconnected to other end points in the first domain via a local network 435. The second enterprise domain includes a backup server or a feed forward server 440. The backup server is likewise connected via the central management system to the cloud domain and first enterprise domain. The backup server may itself be interconnected to other end points in the second domain via a local network 445.

In a specific embodiment, the cloud domain is a public cloud. A public cloud refers to a computing infrastructure in which services are rendered over a network that is open for public use (e.g., Internet). The public cloud can offer on-demand network access to a shared pool of configurable computing resources (e.g., networks, servers, storage, applications, and services).

Some characteristics of a public cloud include on-demand self-service (e.g., consumer can unilaterally provision computing capabilities such as server time, memory, and network storage), resource pooling (e.g., the provider's computing resources are pooled to serve multiple consumers using a multi-tenant model, with different physical and virtual resources such as storage, processing, memory, and network bandwidth dynamically assigned and reassigned according to consumer demand), elasticity (e.g. capabilities can be elastically provisioned and released to scale outward and inward based on demand), and metering (e.g., resource usage can be monitored and reported for billing). Some examples of cloud computing service providers include Amazon Web Services (AWS), Microsoft Azure, HP Public Cloud, IBM SoftLayer, and many others.

In the example of FIG. 4, the cloud domain has been provisioned with a cache server 450, a server group 455, and a cloud storage repository 460. These components may themselves be interconnected via a local network in the cloud domain of the cloud services provider. The server group can include any number of virtual machines. There can be any number of server groups. There can be a tiered arrangement or architecture corresponding to the server groups and storage.

For example, an enterprise application may be distributed across a three-tier architecture. A first tier may include a first server group to handle presentation. A second tier may include a second server group to handle logic. A third tier may include a data tier. The presentation tier may include a user interface to receive user input and output data to the user. The logic tier may include logic to process the input from the user, process the data stored in the data tier, and perform calculations. The data tier provides a repository such as a database or file system for storing data.

The architecture shown in FIG. 4 may be referred to as a hybrid cloud or hybrid computing environment. A hybrid cloud is a composition of two or more clouds such as a private enterprise cloud and a public cloud. A hybrid cloud allows an enterprise to extend its computing capabilities without having to make large capital investments in assets such as physical space and computing hardware. A hybrid cloud can also be used by an enterprise to accommodate spikes in demands for computing resources. An organization can pay for computing resources when they are needed. The organization may have a rental, lease, or other contractual agreement with a cloud services provider for the computing resources. An organization may utilize the services of multiple cloud service providers.

Security and data transfer in a hybrid cloud environment is challenging in two aspects; first the underlying network and infrastructure may be distributed, segregated, and owned by multiple authorities, and second the sensitivity for data encryption key control and the requirement of dynamic data sync is coupled with the infrastructure complexity underneath. Each authority may have different approaches and practices regarding security, privacy, administration, and compliance. Securely and automatically transferring and synchronizing cloud data from behind the enterprise firewall to a public cloud datacenter is difficult.

One reason for the difficulty is that the enterprise network and firewall systems are typically designed to block the transfer of internal data to outside of the company or to only allow transfer from specific machines in specific network quarantine areas. Data transfer and synchronization involve different software tools. Both are extremely sensitive to security control. Enterprises often devote a lot of effort in control just to get the transfer part to work (e.g. tip server). However, the sync function is very different. A drop-box like function is seldom supported formally by the security infrastructure in enterprises.

To securely and automatically execute a data transfer without disrupting legacy infrastructure can be a challenge. It would not be desirable for a hybrid computing environment that carries a significant portion of computing workloads to rely on manual processes in handling data transfer. Rather, full automation is desirable.

Another important concern in the hybrid cloud environment is the protection of the data when it is on the move and is at rest in the public cloud outside of the enterprise firewall. It can be desirable to encrypt the data and that the security key be maintained separately from the resource pool leased from the public cloud. A compliance record showing all application processes that have accessed the data can also be desirable.

In recent years many cloud storage solutions have been proposed to help consumer users to upload their personal data such as photos, video, and office documents in the cloud for backup purposes. Those cloud storage solutions offer capabilities that allow users to share and collaborate among themselves around the data in the cloud. Those "drop box" like solutions, however, do not address the enterprise needs for data transfer to an IaaS public cloud or a hybrid cloud as described above in regards to enterprise computing requirements.

For example, enterprise applications for e-commerce, order fulfillment, customer relationship management (CRM), supply chain, workflow, business intelligence, and so forth typically include multiple components that are distributed or deployed across multiple computing nodes and tiers. These components can receive data as input, process the data, and output results which may, in turn, be provided as input to other components. Providing the input data to, and collecting the result data from the appropriate computing nodes—and forwarding the result data as appropriate—cannot be accomplished by current cloud storage solutions because such solutions do not allow users (e.g., IT administrators) fine-grained control regarding security, synchronization, and where data is to be transferred and stored.

In a specific embodiment, a feature of the system provides for the creation and distribution of data transfer rules based on a data transfer profile. The data transfer profile can be used to specify the transfer of data from one location to another location. In a specific embodiment, the locations are in different or remote domains connected by the Internet. In another specific embodiment, the locations are in the same domain.

As an example, a data source may be located in a first enterprise domain and a data destination may be located in a cloud domain. A data source may be located in the first enterprise domain and a data destination may be located in the second enterprise domain. A data source may be located in the cache server in the cloud domain and a data destination may be located in the server group in the cloud domain. A data source may be located in the cache server in the cloud domain and a data destination may be located in the cloud storage repository in the cloud domain. A data source may be located in the server group in the cloud domain and a data destination may be located in the cache server in the cloud domain. A data source may be located in the cloud storage in the cloud domain and a data destination may be located in the cache server in the cloud domain. A data source may be located in the cache server in the cloud domain and a data destination may be located in the first enterprise domain, second enterprise domain, or both.

In FIG. 4, arrows 465A-E show the flow of data for a "data transfer profile" that supports a hybrid cloud environment. This specific embodiment includes one or more cloud domains and one or more enterprise domains. In this example, the data transfer profile defines the data transfer and synchronization system for this hybrid cloud environment.

Any number of data transfer profiles can be supported concurrently over the secure data transfer platform. For example, there can be one, two, three, four, five, or more than five profiles. In this example, the data transfer profile specifies one or more of the following components: source server 430, cache server 450, and backup server 440. In a specific embodiment, a "flow" like the one shown in the example of FIG. 4 can be considered as one "rule" for data transfer. A rule can be a data upload rule, download rule, or a combination of both. Each data transfer profile can have multiple rules. Each data transfer profile can associate with an "Application Profile" that describes the virtual hybrid cloud infrastructure involving multiple domains and tiers of computing (e.g. 3-tier computing). Users can then have many application profiles with many data transfer profiles with many data transfer rules to model their complex applications running in a hybrid environment. Application profiles are further discussed in U.S. patent application Ser. No. 14/190,019, filed Feb. 25, 2014, which is incorporated by reference.

In a specific embodiment, the source server is provisioned with a source directory where all files under this source directory will be automatically transferred and synchronized to the cache server in the cloud. The files in the source directory are uploaded from the local TCP/IP network using regular user access privilege control. In other words, access permissions or access control lists (ACLs) as defined by the operating system can be maintained. For example, the Unix operating system allows an administrator to define rwx (Read, Write, Execute) for each file for users, groups, and super user. Standard Unix access privilege control is still honored in this system as the baseline requirement. The system will not violate the Unix system.

In this specific embodiment, the cache server is provisioned with a source directory where all files under this source directory were automatically transferred and synchronized from the source server. All or part of the files under this source directory can be provisioned to transfer to the central cloud storage device, the cloud server in the server group (e.g., virtual machine in the server group), or both.

In this specific embodiment, the cache server is also provisioned with a backup directory where all or part of the files under this directory were transferred from a cloud server (e.g. virtual machine) in the server group, from a central cloud storage device, or both. These files can be automatically backed up to the backup server that may be in a location remote from the cloud domain.

In this specific embodiment, the backup server is provisioned with a backup directory where all files under this backup directory were automatically transferred from one or more cache servers in the cloud domain.

In a specific embodiment, there are two types of data transfer paths in the system. A first type of transfer path may be referred to as an upload sync (or synchronization) path. A second type of transfer path may be referred to as a download sync (or synchronization) path. In this specific embodiment, the upload sync paths include first, second, and third upload sync paths. A first upload sync path is from source server (master) 430 to cache server (slave) 450. A second upload sync path is from cache server (master) 450 to central cloud storage (slave) 460. A third upload sync path is from cache server (master) 450 to cloud server (slave) 455 (e.g. to a server or virtual machine in the server group).

The download sync paths include first, second, and third download sync paths. A first download sync path is from central cloud storage (master) 460 to cache server (slave) 450. A second download sync path is from cloud server (master) 455 to cache server (slave) 450. A third download sync path is from cache server (master) 450 to backup server (slave) 440.

Central Management System

In a specific embodiment, the central management system includes two primary pieces. A first piece includes a management system. A second piece includes a virtual cloud fabric. The management system is responsible for supporting data transfer profile provisioning, central policy programming, security key management, application interlock provisioning, and other features.

The virtual cloud fabric supports forwarding Transmission Control Protocol (TCP) connections from the source server, cache server, and backup server and switches all traffic at the central management system accordingly. This virtual cloud fabric features a design that helps the secure data transfer platform to work through the enterprise legacy firewall infrastructure without disruptions. U.S. patent application Ser. No. 14/187,091, filed Feb. 21, 2014, provides further details of this design and is incorporated by reference along with all other references cited in this application.

File Systems and Synchronization Scheme

In a specific embodiment, the file systems for the corresponding directories under the source server, cache server, and backup server are designed based on the upload and download sync paths. The file systems are dynamically extendable reacting to the elastic computing in the cloud by individual cloud features. A technique of the system operates at the virtual file system level (e.g., software level) and is extendable based on size. The file systems allow users to provision and select which directories, sub-directories, files, or combinations of these to upload and download with synchronization.

Figure 5:
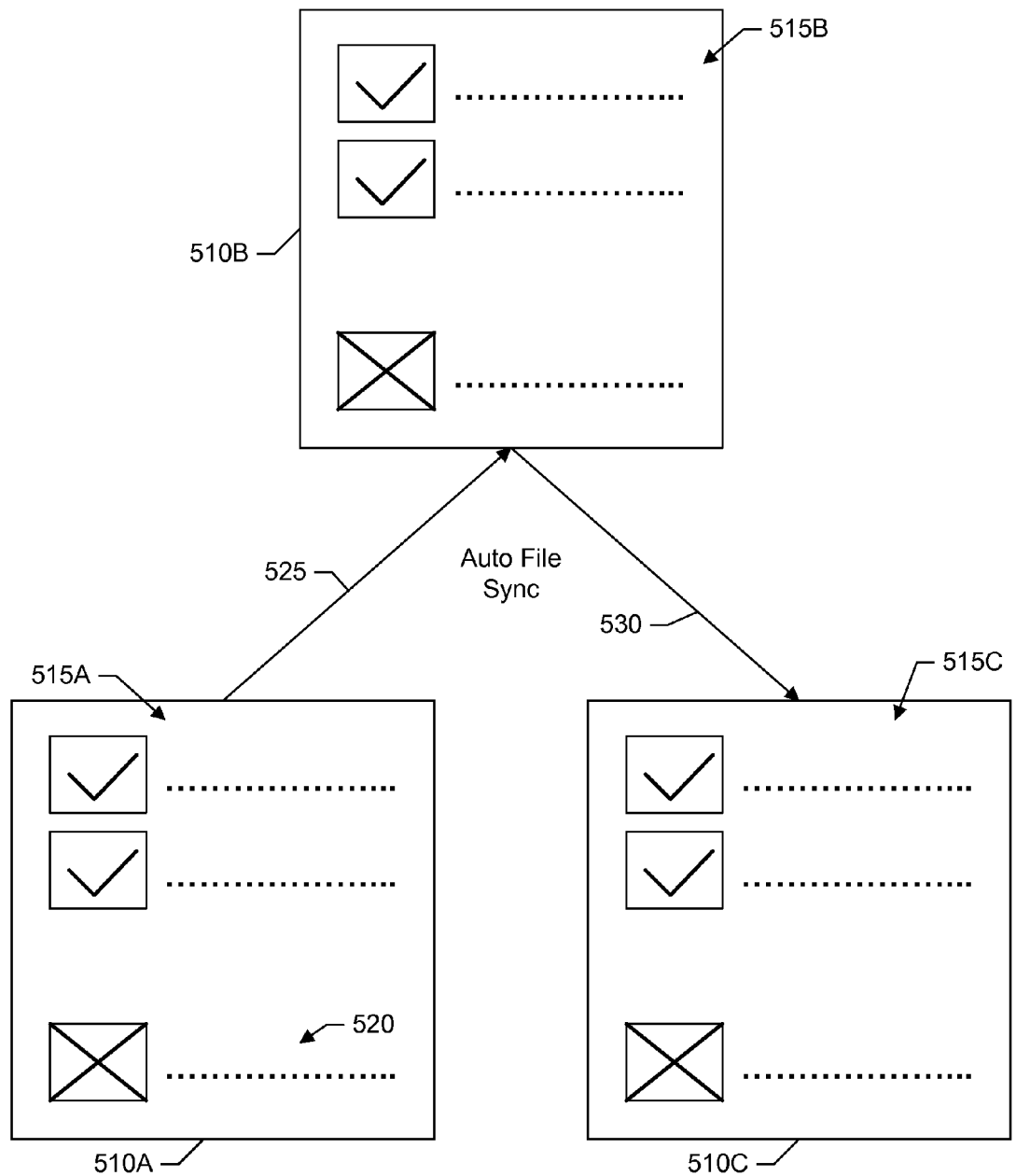
FIG. 5 shows a block diagram for automatically syncing files across different domains.

FIG. 5 shows a block diagram of an automatic file sync across the first enterprise domain, cloud domain, and second enterprise domain. In the example shown in FIG. 5, the source server in the first enterprise domain includes a first folder 510A having a first set of files 515A. The cloud server in the cloud domain includes a second folder 510B having a second set of files 515B. The backup server in the second enterprise domain includes a third folder 510C having a third set of files 515C.

A data transfer profile can be configured such that a change to a folder, file, or both in one domain is propagated to the other domains. A change can include creating a new file, creating a new subfolder, deleting an existing file, deleting an existing subfolder, renaming a file, renaming a subfolder, moving a file, moving a subfolder, altering a file, alerting a subfolder, or combinations of these.

For example, consider that a file 520 is added to first folder 510A in the first enterprise domain. In this example, the source server is the source and the cloud server is the destination for the upload transfer. For download transfer, the cloud server is the source, and the backup server is the destination. In this process, the cache server although present is not shown as the source or destination in FIG. 5 for purposes of clarity. A copy of the file will be transmitted 525 from the first enterprise, via a cache server (not shown in FIG. 5) to the cloud server in the cloud domain. Another copy of the file will be transmitted 530 from the cloud server, via the cache server (not shown in FIG. 5) to the backup server in the second enterprise domain.

Data Encryption and Security Key Management

In a specific embodiment, the data transfer platform is a secure system where all files are always encrypted during transfer among the source server, cache server, cloud server, and backup server, and at rest on the central cloud storage device or on a local virtual disk on a cloud server.

In a specific embodiment, one unique security key is created and used for each data transfer profile and is maintained in the central management system. That is, in this specific embodiment, the security key is maintained outside of the logic boundary of the public cloud and its management system. The access of this security key for export is carefully designed and made possible with another pair of keys owned by two separate administrators and operated concurrently on the system. A key change is also made possible by coupling with an automatic data flushing on the cloud storage and re-upload with newly encrypted data files.

In this specific embodiment, on the central management system, when a data transfer profile is created, a security key is generated to associate with the profile. When the data transfer profile is activated, the security key will be transferred from the central system to the agent software that is running on the source server, cloud server, and backup server, and then uploaded into the encryption layer of the virtual file system in the kernel space. The security key will stay in the real memory and cannot be exported. The encryption layer of the kernel will then be responsible for encrypting and decrypting data in and out of the virtual file system. The whitelist and "interlock" system, as discussed below, is another layer that is plugged in the monitoring layer in the kernel for a different purpose (i.e., the interlock).

Figure 6:
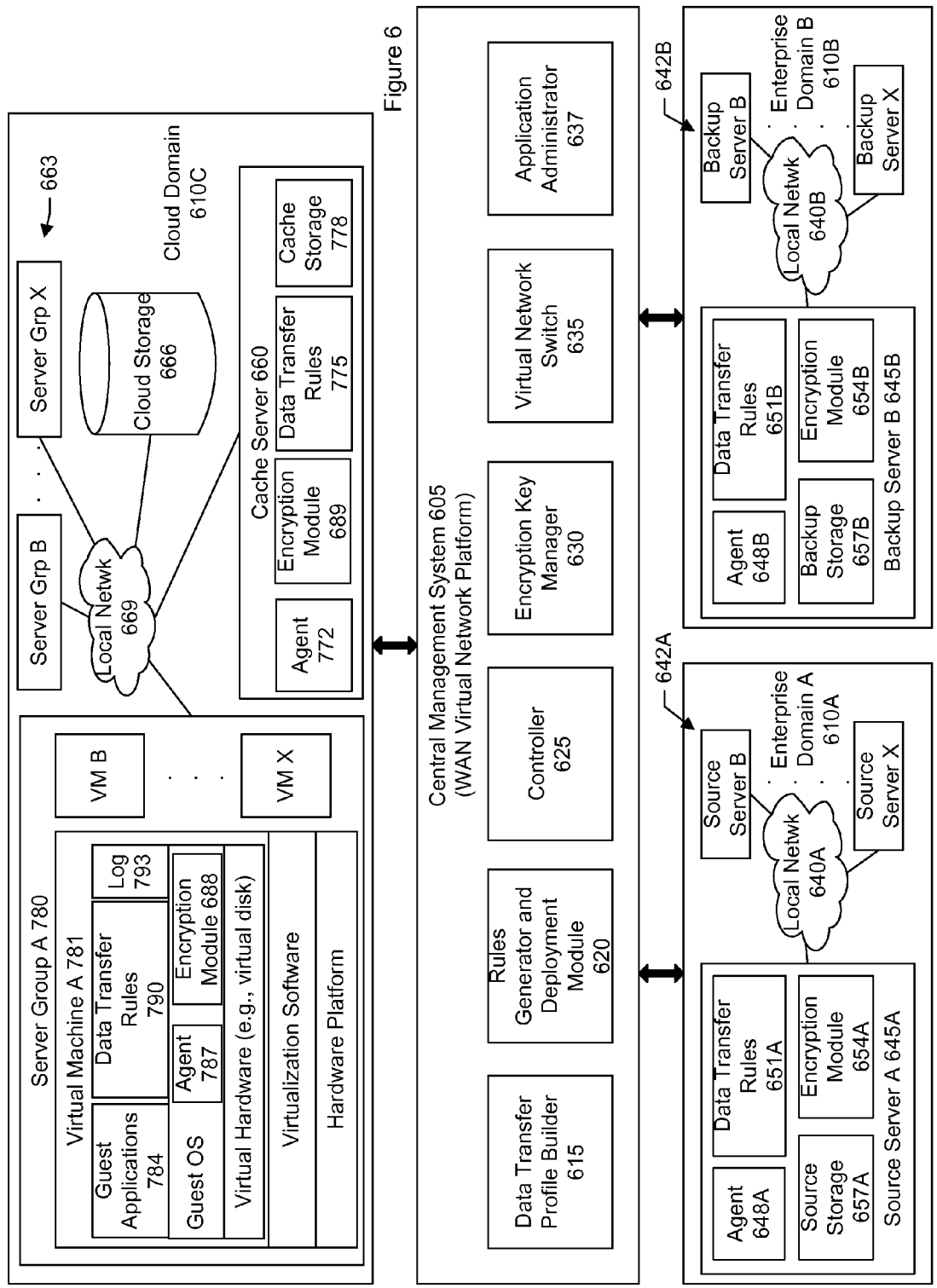
FIG. 6 shows a more detailed system architecture for a specific embodiment of the secure data transfer platform.

FIG. 6 shows a more detailed block diagram of a specific embodiment of the system architecture shown in FIG. 4. As discussed above, this system architecture includes a central management system 605 that may be referred to as a virtual network platform. The central management system (or virtual network platform) can interconnect a first enterprise domain 610A, a second enterprise domain 61013, and a cloud domain 610C. In this specific embodiment, the central management system includes a data transfer profile builder 615, a rules generator and deployment module 620, a controller 625, an encryption key manager 630, a virtual network switch 635, and an application administration module 637.

The first enterprise domain includes a first set of end points interconnected by a local network 640A. In this example, the first set of end points have been identified as source servers 642A. A domain can include any number of source servers. For example, there can be 1, 2, 3, 4, 5, 10, 100, 200, or more than 200 source servers in a domain.

A source server can be a general purpose computer that may include hardware and software such as that shown in FIGS. 2-3 and described above. For example, the source server may include storage 657A, memory, a processor, and so forth. In a specific embodiment, a source server 645A is further provided with an agent 648A, and an encryption module 654A for encrypting data transferred out and decrypting data transferred in as appropriate. Data transfer rules 651A are received from rules deployment module 620 of the central management system and stored at the source server.

Similarly, the second enterprise domain includes a second set of end points interconnected by a local network 6401. In this example, the second set of end points have been identified as backup servers 642B. A domain can include any number of backup servers. For example, there can be 1, 2, 3, 4, 5, 10, 100, 200, or more than 200 backup servers in a domain.

A backup server can be a general purpose computer that may include hardware and software such as that shown in FIGS. 2-3 and described above. For example, the backup server may include storage 657B, memory, a processor, and so forth. In a specific embodiment, a backup server 645B is further provided with an agent 648B, and an encryption module 654B for encrypting data transferred out and decrypting data transferred in as appropriate. Data transfer rules 651B are received from rules deployment module 620 of the central management system and stored at the backup server. It should be appreciated that the server identified as the backup server is not limited to merely backing up data. For example, the server can operate as a feed forward server that bridges the data for the next step of an analysis. The analysis can be a real-time or non-real time analysis.

The cloud domain includes a cache server 660, server groups 663, and cloud storage 666, each of which may be interconnected by a local network 669 of the cloud domain. Although FIG. 6 shows a single cache server, it should be appreciated that there can be any number of cache servers for load balancing, redundancy, and the like. The cache server may itself be implemented as a virtual machine. In a specific embodiment, the cache server includes an agent 772, cache storage 778, and an encryption module 689 for decrypting data transferred in and encrypting data transferred out as appropriate. Data transfer rules 775 are received from rules deployment module 620 of the central management system and stored at the cache server.

A server group can be a logical grouping of one or more virtual machines (or physical machines). A server group can include any number of virtual machines. For example, a server group may include 1, 2, 3, 4, 5, 10, 50, 100, or more than 100 virtual machines. A virtual machine (VM) is a sotware implementation of a machine (e.g., a computer) that executes programs like a physical machine. In other words, the virtual machine is a software abstraction of a physical computer system that is installed as a "guest" on the "host" hardware platform.

In a virtual machine environment, the hardware platform may be referred to as a host, host machine, or host computer. The host uses the virtualization software to run the virtual machines or virtual devices. Generally, virtualization is an abstraction layer that allows multiple virtual environments to run in isolation, side-by-side on the same physical machine.

A virtual machine can include a guest operating system, guest applications running on the guest operating system, and virtual hardware which represents a hardware state of the virtual machine. The virtualization software may include a hypervisor or virtual machine monitor (VMM) that presents the guest operating system with a virtual operating platform. Virtual hardware refers to the hardware resources allocated to the virtual machine and is mapped to the hardware platform. The virtual hardware may include virtual disks, virtual processors, virtual system memory, and various virtual devices for which the guest operating system includes corresponding drivers. A host hardware platform may host multiple virtual machines. Each virtual machine may be assigned an identifier such as an Internet Protocol (IP) address.

In the example shown in FIG. 6, a server group 780 includes a virtual machine 781 that includes guest applications 784, an agent 787, data transfer rules 790, and a log 793. A virtual machine may further be provisioned with an encryption module 688 for decrypting data that is transferred in and encrypting data that is transferred out as appropriate. The log may be referred to as a compliance record.

Figure 7:
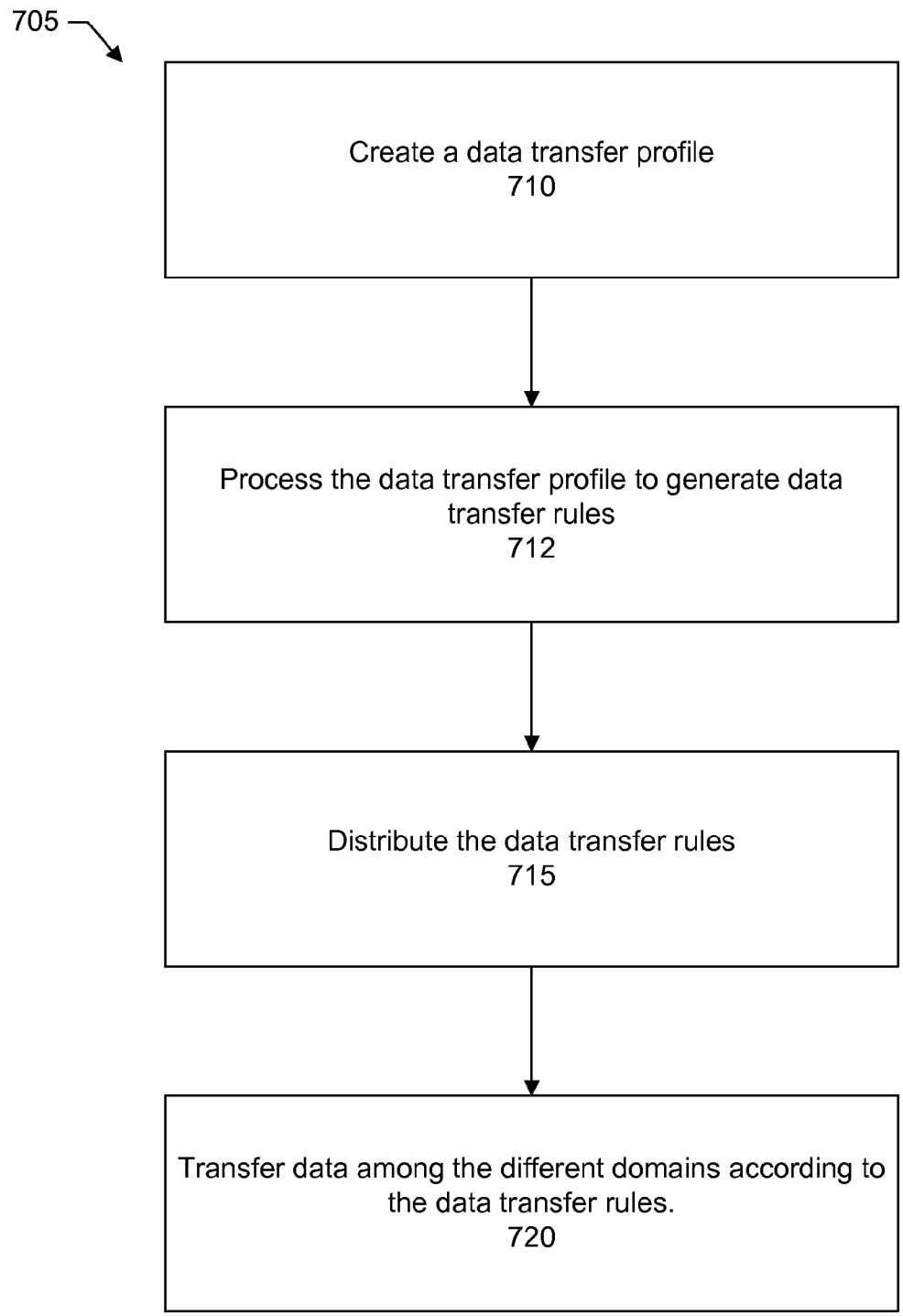
FIG. 7 shows an overall flow diagram for the secure data transfer platform.

FIG. 7 shows an overall flow 705 of the system. Some specific flows are presented in this application, but it should be understood that the embodiments are not limited to the specific flows and steps presented. A flow of an embodiment may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular application or based on the data.

In brief, in a step 710, a user (e.g., administrator) uses the central management system to create a data transfer profile. In a step 712, the data transfer profile is processed to generate a set of rules and sub-rules. In a step 715, the system distributes the rules and sub-rules in the profile to the servers in the various domains that define the necessary actions each server will take to implement the profile. In a step 720, data (e.g., files) is transferred according to the rules and sub-rules in various servers and therefore implementing the profile defined in the central system.

More particularly, data transfer profile builder 615 (FIG. 6) provides an interface to create and edit data transfer profiles. The data transfer profiles are stored at the central management system. In a specific embodiment, the interface includes a graphical user interface (GUI) that allows an administrator to define a data transfer profile. The GUI may include widgets or controls such as drag-and-drop controls, dropdown menus, buttons, help text, wizards, and the like. In another specific embodiment, the interface includes a programmatic interface (e.g., application programming interface (API)) where the profile can be defined through a series of API calls. In another specific embodiment, an administrator can upload a transfer profile to the system.

The rules generator and deployment module is responsible for processing, analyzing, or compiling the profile definition, generating all data transfer rules and sub-rules, and distributing the rules and sub-rules to the various servers in various domains. For example, a set of different sub-rules may be distributed to the source server, backup server, cache server, and cloud servers.

In a specific embodiment, a data transfer profile can include multiple "rules" for data transfer. Each rule can involve a source server and a destination server and the paths on where the data are from and where the data are going to. One rule can apply to one source server and apply to many (two or more) destination servers (data duplications). At the cloud server level, there is server agent software including a "sub-rule" that defines the activities that need to be done at the cloud server level. All "sub-rules" together implement the data transfer rule, and all rules together implement the data transfer profile. Each data transfer profile may be associated with one application profile that defines how a particular enterprise application (e.g., CRM, ERP, Dev-test, HR, etc.) is provisioned in the virtual hybrid infrastructure environment.

The encryption key manager manages the encryption keys that encrypt the data during transport and while at rest. In a specific embodiment, each data transfer profile is associated with an encryption key. In this specific embodiment, a data transfer profile may include many rules and cover many server instances that will receive many sub-rules. One security key is associated with one data transfer profile and is used for all sub-rules at all involved servers. This helps to ensure data integrity. It is desirable for an encryption system to protect the data. It is also desirable for the system to maintain integrity for associated data so that they all can be recovered consistently. In this specific embodiment, a single security key per data transfer profile is used to achieve the balance between "high security" versus "ease of use." Each customer may be associated with a particular key to help ensure security granularity and control.

The controller in conjunction with the virtual network switch is responsible for coordinating the receipt and forwarding of the data (e.g. files) among the various domains. The controller and virtual network switch are further discussed in U.S. patent application Ser. No. 14/187,091, filed Feb. 21, 2014.

The application administration module provides an interface for administrators to define a listing of applications that will be allowed to access the enterprise data (e.g., files) that are stored in the cloud domain. In a specific embodiment, the data access is denied if the applications that request the access are not listed on the list. Applications that are listed on the list are provided a decrypted version of the file.

As discussed above, an application can include but is not limited to applications software, end-user programs (e.g. word processors, text editors, or electronic design automation (EDA) software), systems software, a software tool, executable software, utility programs, programming tools, code components, macros, computer programs, applets, firmware, plugins, extensions, executable binary, Java code, scripts. Makefile, Operating System commands, and the like. The data can include but is not limited to a file, file system object, non-file system object (e.g. electronic mail messages). Microsoft office document (e.g., MS Word file, Excel spreadsheet), Portable Document Format (pdf) file, any image file (e.g., Portable Network Graphics (PNG) file, or Graphics Interchange Format (GIF) file), binary file, executable file, scripting file, audio file (e.g. MP3 file), video file (e.g. AVI file), and the like.

In a specific embodiment an application software may be listed on the whitelist that is allowed to access a list of document files. This approach helps to protect the document files against data leak by allowing only certain software to access the data. In another specific embodiment, a job starting software is listed on the whitelist that is allowed to execute a specific executable file (e.g. a specific application software) that is encrypted for piracy protection. This approach helps to protect a commercial software tool against piracy such that this software can start only inside a specific environment where a specific job starting software is provisioned on the whitelist to access the executable file and start the tool. Further discussion is provided below.

Software agents provided at the source servers, cache servers, backup servers, and server groups evaluate the data transfer rules to identify the data (e.g., files, blocks in a file, or bytes in a file) that should be transferred from one domain to another domain. An agent may be installed on the source and backup servers. An agent may be installed on the virtual machines and cache server as part of a cloud provisioning operation.

Based on the rules evaluation, an agent may make decisions such as which files should be transferred, when the files should be transferred, whether the transfer should include copying or moving the files to the destination, where or in what folder the transferred files should be placed, and how the files should be formatted for transfer. The rules or sub-rules received by an agent may be different from the rules or sub-rules received by another agent. For example, the set of rules received by an agent located at the source server in the enterprise domain may be different from the set of rules received by an agent located in the server group of the cloud domain because each agent may have different responsibilities in managing the transfer of the data.

Deploying a customized set of data transfer rules helps to conserve network bandwidth. The amount of storage space required at the servers for the rules can be reduced because each server stores a subset of the rules, each rule of the subset being relevant to the server, rather than the complete set of rules. The system can transfer the entire file or only changes to the file at block level or byte level. For example, the first time a file is transferred the entire file may be transferred. Afterwards, the system can transfer only the delta or changes to the file. Transferring only the changes helps to reduce the amount of network bandwidth.

As another example, there may be a requirement in the data transfer profile that a file to be transferred be encrypted. The processing of the data transfer profile will generate a lower level rule that includes an attribute having a value that specifies encryption. In this case, the agent may obtain an encryption key from the key manager to encrypt the file. Agents are responsible for identifying the files or changes from the folders identified in the data transfer rules, encrypting the data, and executing the transport.

As another example, a transfer profile may specify that the data be compressed using a specific compression algorithm prior to transport. The processing of the data transfer profile will generate a lower level rule that includes an attribute having a value that specifies the particular compression algorithm. Agents coordinate the transfer with the controller of the central management system. Agents are responsible for receiving the transferred data, decompressing the data as required, and recovering the files with changes in the destination folder identified in the data transfer rules or profile.

In a specific embodiment, agents are operating system level code modules. For example, an agent may be embedded in the operating system. In another specific embodiment, an agent may execute outside of the operating system.

Defining a data transfer profile may include identifying a first folder in a first domain as being a source, and identifying a second folder in second domain, remote from the first domain, as being a destination or target. Files in the first folder may then be transferred from the first folder to the second folder. In a specific embodiment, transferring includes copying a file from the first folder into the second folder. In this specific embodiment, after the transfer operation both the first and second folders will have a copy of the file. In this specific embodiment, after the initial transfer of the data, any change to this data in the first folder will be synchronized and updated to the data in the second folder.

In another specific embodiment, transferring includes moving a file from the first folder into the second folder. In this specific embodiment, after the transfer operation the second folder will have a copy of the file. The first folder will not have a copy of the file.

In a specific embodiment, the first domain includes an enterprise domain. That is, the first domain may be owned by a private enterprise. The second domain includes a cloud domain. That is, the second domain may be owned by a cloud services provider.

In another specific embodiment, the first domain includes a cloud domain and the second domain includes an enterprise domain. In another specific embodiment, the first domain includes an enterprise domain and the second domain includes another enterprise domain. In this specific embodiment, both domains may be owned by the same enterprise. For example, the first domain may include the main office of the enterprise. The second domain may include a remote branch or satellite office. Alternatively, each domain may be owned by different enterprises. For example, the first domain may be owned by a manufacturer. The second domain may be owned by a supplier.

Defining a data transfer profile may include identifying a server group in the cloud domain as a destination, identifying a virtual machine in a server group as a destination, identifying a server group in the cloud domain as a source, identifying a virtual machine in a server group as a source, or combinations of these.

Table A below shows an example of a data transfer profile.

TABLE A

```
<?xml version="1.0" encoding="UTF-8"?>
<data transfer profile>
    <transfer paths>
        <transfer path-1>
            <name>upload path</name>
            <source domain>
                <domain>first enterprise domain</domain>
                <machine>source server</machine>
                <folder>source server folder</folder>
            </source domain>
            <destination domain>
                <domain>cloud domain</domain>
                <server group>second server group</server group>
                <rule>auto-provisioning</rule>
            </destination domain>
        </transfer path-1>
```

TABLE A-continued

```
    <transfer path-2>
        <name>download path</name>
        <source domain>
            <domain>cloud domain</domain>
            <server group>second server group</server group>
            <rule>auto-provisioning</rule>
        </source domain>
        <destination domain>
            <domain>second enterprise domain</domain>
            <machine>backup server</machine>
            <folder>backup server folder</folder>
        </destination domain>
    </transfer path-2>
</transfer paths>
</data transfer profile>
```

In a specific embodiment, when the source or destination is a server group or a server group managed under a cloud orchestration manager, the virtual machines may not be listed explicitly in the data transfer profile. Instead, all virtual machines will be dynamically recognized and included as the source or destination by the system. This design allows the data transfer profile to dynamically operate with the cloud. For example, during production or operation virtual machines may be provisioned into a server group, decommissioned or deleted from a server group, or both. It is not necessary that a new data transfer profile be created to reflect these changes because the server group specified in the data transfer profile is an abstraction.

In this specific embodiment, the data transfer profile is a "definition" and it may not have any "physical implementation" yet. Later when the profile is "activated," the system will ask or prompt the administrator to either manually provision all servers or dynamically provision all servers. Since the "rules" are all defined in the profile already, the system applies the rules and sub-rules to all servers automatically. The exact definition of a server group defined in the data transfer profile (e.g., the identification of specific virtual machines in the server group) can be decoupled from the data transfer profile. This allows the data transfer profile to be created or predefined as part of a configuration step in deploying an application even though virtual machines have not yet been provisioned. Once the virtual machines have been provisioned, a subsequent step can include processing the data transfer profile along with the identification of the virtual machines to generate the data transfer rules. A data transfer rule may then include, among other attributes, the identification of the virtual machine.

Figure 8:
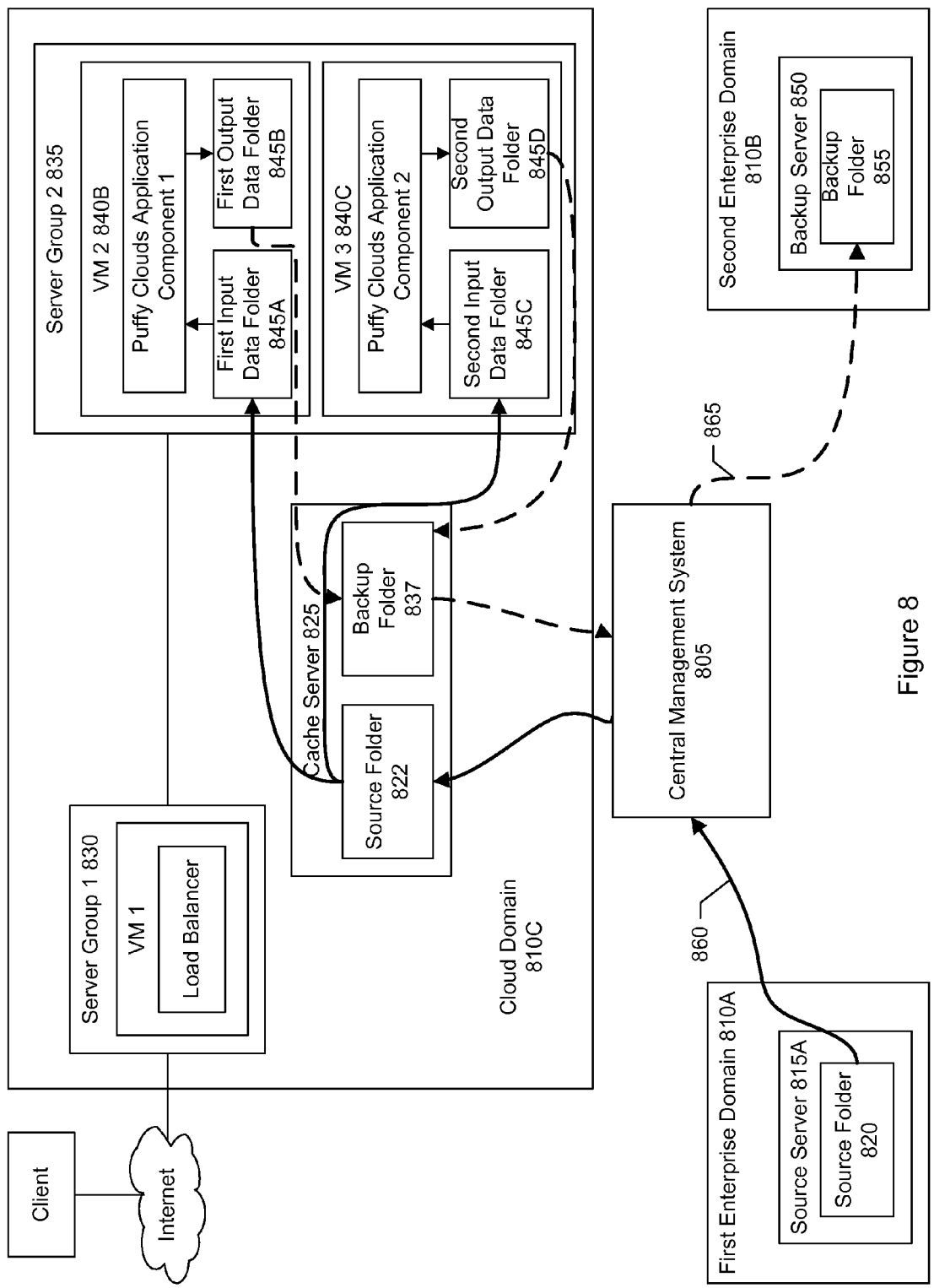
FIG. 8 shows a block diagram of upload and download paths across domains as specified in a data transfer profile.

FIG. 8 shows an example of the data transfer flows specified in the data transfer profile shown in table A. As shown in FIG. 8, central management system 805 connects a first enterprise domain 810A, a second enterprise domain 810B, and a cloud domain 810C. The first enterprise domain includes a source server 815A having a source server folder 820.

The cloud domain includes a cache server 825, a first server group 830, and a second server group 835. The cache server has a source folder 822, and a backup folder 837. The first server group includes a load balancer. The second server group includes second and third virtual machines 840B-C. The first virtual machine has a first input data folder 845A and a first output data folder 845B. The second virtual machine has a second input data folder 845C and a second output folder 845D.

The second enterprise domain includes a backup server 850 having a backup server folder 855.

Arrows 860 drawn using solid lines indicates the "upload path" as specified in the data transfer profile shown in table A.

Figure 9:
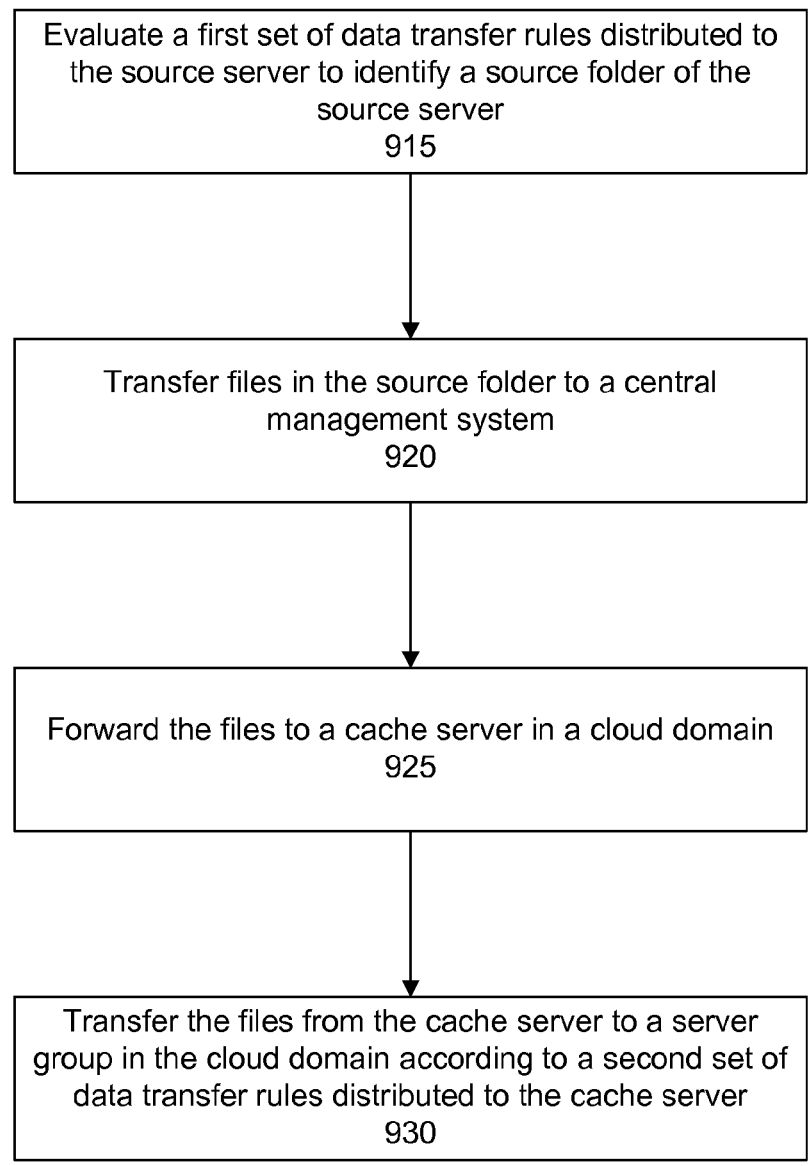
FIG. 9 shows a flow diagram for an upload path of a data transfer profile.

FIG. 9 shows a flow 905 for the upload path as specified in the data transfer profile. In a step 915, a first set of rules distributed to the source server is evaluated to identify a source folder of the source server.

In a step 920, files in the source folder are transferred to the virtual network switch in the central management system. In a step 925, the files are forwarded from the virtual network switch in the central management system to the cache server in the cloud domain. In a step 930, the files are transferred from the cache server to the server group in the cloud domain according to a second set of rules distributed to the cache server. In a specific embodiment, the central management system is not used as a "staging area" for the data. That is, the data is not persisted at the central management system. The virtual network switch in the central system immediately switches the data away. Instead, the cache server functions as the data staging system. The data can be replicated to multiple cloud servers in the upload path. In the download path, multiple cloud servers can transfer their data to the cache server and then forward down to the backup server.

According to the upload path in the profile, the source domain is the first enterprise domain. The destination domain is the cloud domain. More particularly, as shown by arrows 860, the upload path is from source folder 820 to the central management system to source folder 822 of the cache server and to first and second input data folders of the second and third virtual machines, respectively, of the second server group.

Figure 10:
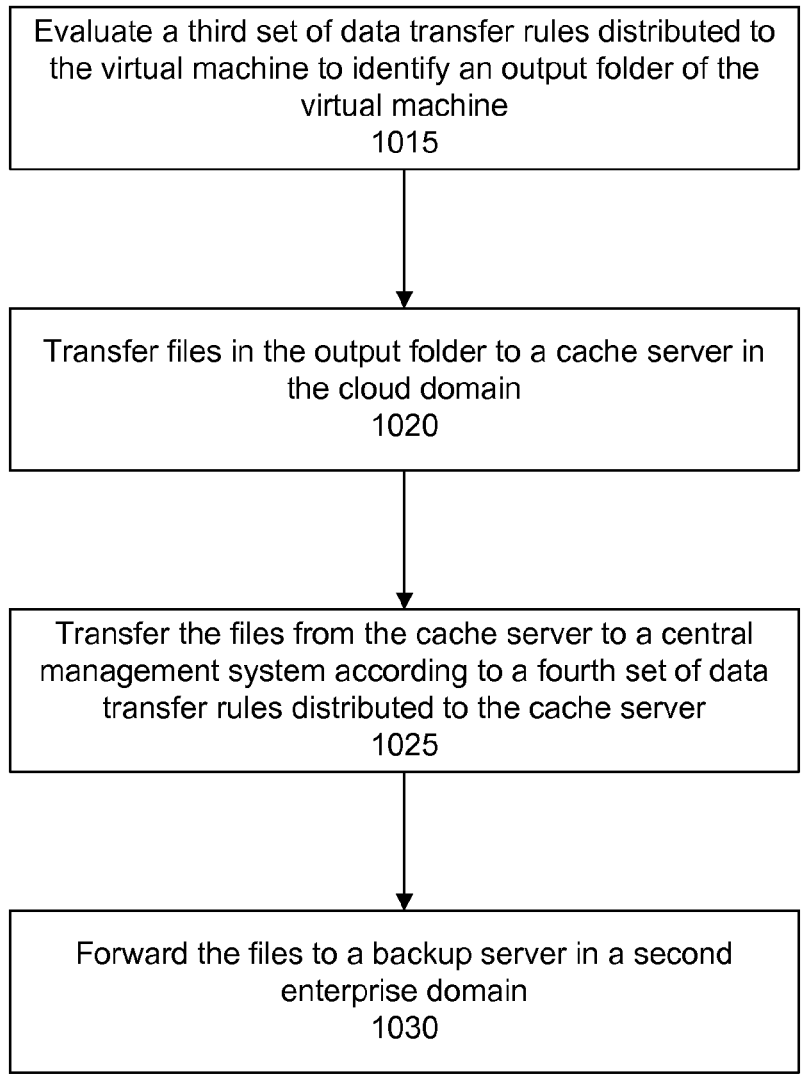
FIG. 10 shows a flow diagram for a download path of a data transfer profile.

Referring now to FIG. 8, arrows 865 drawn using broken lines indicate the "download path" as specified in the data transfer profile shown in table A. FIG. 10 shows a flow 1005 for the download path as specified in the profile. In a step 1015, a third set of rules distributed to a virtual machine of a server group is evaluated to identify an output folder of the virtual machine. In a step 1020 files in the output folder are transferred to the cache server in the cloud domain. In a step 1025, the files are transferred from the cache server to the virtual network switch in the central management system according to a fourth set of rules distributed to the cache server. In a step 1030, the files are forwarded from the virtual network switch in the central management system to the backup server in the second enterprise domain according to the data transfer profile.

More than one virtual machines in a server group may be involved in a download path. For example, there can be multiple virtual machines (e.g., two or more virtual machines) processing the data transferred from the enterprise domain. The result from the processing may be stored in an output folder at each respective virtual machine. The result from each output folder of each virtual machine may be downloaded or transferred back to the enterprise domain (or other domain as desired) for backup or further analysis of the result data.

According to the download path in the profile, the source domain is the cloud domain. The destination domain is the second enterprise domain. More particularly, as shown by arrows 865, the download path is from the first and second output data folders of the second and third virtual machines, respectively, of the second server group to backup folder 837 of the cache server to the central management system to backup folder 855 of the backup server in the second enterprise domain.

In a specific embodiment, the cache server provides a point at which multiple copies of data (e.g., files) as needed may be distributed over the local network of the cloud domain. For example, in some cases a file at the source server may need to be distributed to two or more virtual machines in the cloud domain. Transmitting multiple copies of the file from the source server in enterprise domain to the virtual machines in the cloud domain can take a significant amount of time because the files will be transmitted over a wide area network (e.g. the Internet). In this specific embodiment, a single copy of the file can be sent to the virtual network switch in the central management system. The central management system forwards the single copy of the file to the cache server in the cloud domain. The cache server can then distribute multiple copies of the file to each virtual machine in the cloud domain as needed using the local network of the cloud domain.

The transfer of data among the different domains can be used for an application (e.g., Puffy Clouds) that has been deployed in the cloud domain. The application may be, for example, an e-commerce application that is accessible over the Internet by a client. As an example, data from the source server can include product descriptions (e.g., product pricing information) that are uploaded to the input data folders. The cloud domain may host the application and use the data in the input data folders to display information about the products. Consumers can access the cloud-based application to browse and purchase the products. Order information may be stored in the output data folders. The order data can then be downloaded back to the enterprise for backup, analysis, or both.

The example of a data transfer profile shown in table A is formatted as an Extensible Markup Language (XML) file. XML is a markup language that defines a set of rules for encoding documents in a format or structure that is both human-readable and machine-readable.

The characters making up an XML document include markup and content. Generally, strings that constitute markup either begin with the character "<" and end with a ">," or they begin with the character "&" and end with a ";." A tag is a markup construct that begins with "<" and ends with ">." An element is a logical document component which either begins with a start-tag and ends with a matching end-tag or consists only of an empty-element tag. The characters between the start- and end-tags, if any, are the element's content, and may contain markup, including other elements, which are called child elements. An attribute is a markup construct including a name/value pair that exists within a start-tag or empty-element tag.

It should be appreciated, however, that the transfer profile shown in table A is merely one example of a data transfer profile. A transfer profile may be in text form, ASCII text, binary form, or a programming language (e.g. Java, C++, C#, Perl, or Python). The data transfer profile provides the administrator with great flexibility and control over the movement of data across different domains. Table B below lists some attributes that may be used in a data transfer profile to control, direct, and manage the movement of data. These attributes may then be translated into data transfer rules when the data transfer profile is processed.

TABLE B

| Attribute | Description |
| --- | --- |
| Source domain | Allows administrator to specify a domain from which data (e.g.. files) will be transferred. |
| Source machine or subnet | Allows administrator to specify the machine, subnet, or both from which data will be transferred from. Identifying the machine, subnet, or both may be via an Internet Protocol (IP) address or other identifier. |
| Source folder | Allows administrator to specify the source folder or source folder path from which data will be transferred from (e.g., c:\documents\products\price_list.txt) |
| Destination or target domain | Allows administrator to specify a domain to which data will be transferred. |
| Destination or target machine or server group | Allows administrator to specify the machine, server group, or both to which data will be transferred to. |
| Destination or target folder | Allows administrator to specify the destination folder or destination folder path which data will be transferred to. |
| Transfer type | Allows administrator so specify whether the transfer should be a copy operation or delta operation or a move operation. |
| Encrypted/Unencrypted | Allows administrator to specify whether or not data should be encrypted for transfer. It can be desirable to encrypt a file if the file includes sensitive and propriety information, Encryption (and subsequent decryption), however, can be a computationally expensive process. So, the system can provide an option for administrators to decide whether or not to encrypt. |
| Encryption type | Allows administrator to specify the type of encryption. |
| Encryption key | Allows administrator to associate the data transfer profile with an encryption key. |
| Compression type | Allows administrator to specify the type of data compression for the transfer (e.g., gzip, bzip2, tar, or zip). |
| Transfer Start Time | Allows administrator to specify the time and day for a transfer. For example, an administrator may specify transfers during off-peak hours (e.g., Sundays between 12:00 am and 4:00 am). Alternatively, administrators may specify real-time transfers where transfers begin as soon as there is data to transfer (e.g., as soon as a file is added to the folder). |
| Transfer End Time | Allows an administrator to specify a cut-off time for a transfer. In progress transfers may be paused in order to provide network bandwidth for other applications. |
| Transfer Frequency | Allows an administrator to specify the time window for data checking for transfer or delta synchronization |
| Log | Allows administrator to specify whether or not the transfer should be logged. |
| Filter | Allows administrator to specify criteria in which one or more files in a particular source folder will not be transferred to a destination folder. |

A data transfer profile may specify one or more rules to be evaluated. For example, a rule may include a condition (e.g., if <condition> then TRANSFER). If the condition is satisfied a transfer operation will occur. If the condition is not satisfied a transfer operation will not occur. As an example, a condition may specify a particular filename that if present in the source folder will result in the files in the source folder being transferred. There can be nested conditionals, multiple conditionals, Boolean operators (e.g., OR, AND, or NOT), or combinations of these.

Figure 11:
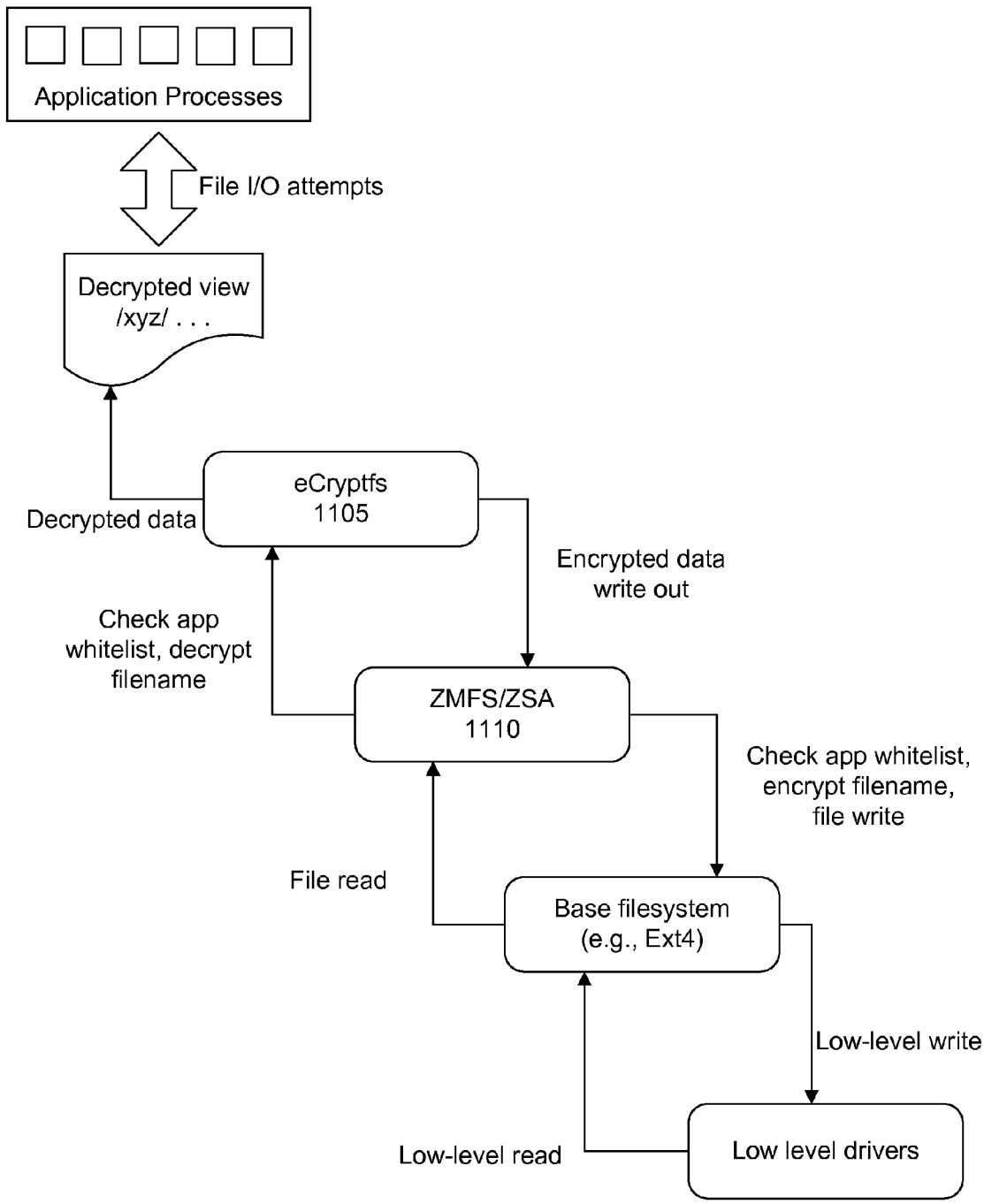
FIG. 11 shows a flow for interlocking an application and a file.

FIG. 11 shows a block diagram of a specific embodiment of a feature that may be referred to as application interlock. In this specific embodiment, the application interlock provides for interlocking the application type and version with the data or encrypted data for access or execution (read, write, execute). The application interlock protects the enterprise data in a public cloud outside of enterprise firewall. In a specific embodiment, application interlock technology allows users to specify a whitelist of application tools that are allowed to access the encrypted data in the cloud. In other words, data access can be restricted based on an application tool. In this specific embodiment, the data will be decrypted only when an access is approved by the security control system equipped in every one of the cloud servers where the application tools are executed. The security control system is integrated with the file system to assure this protection function is not easily breakable even when root is compromised in an operating system.

eCryptfs 1105 is an example of an encryption file system that is stacked on the top of a monitoring file system 1110. An example of a monitoring file system is Zentera Monitoring File System/Zentera Server Agent (ZMFS/ZSA) as provided by Zentera Systems, Inc. of San Jose, Calif. ZMFS is a light weight, security control system that is located in the kernel space, connecting to ZSA (server agent running in the user space), and is responsible for checking application processes against the security policy for accessing the protected data. If the application process matches the security policy, the data will be decrypted and provided to the application process. If the checking fails, the access will be denied and the data will stay in its encrypted format; that is, protected against the unauthorized process.

If for any reason ZSA or ZMFS is compromised, the access path for eCryptfs will be broken immediately. As a result the data stays encrypted and protected against any unauthorized access. In this case, users do not have to worry about the loss of data since the data is under the protection by encryption. An advantage of this system is that a rebuild of a Unix kernel is not necessary for the solution deployment. As a result, this system can easily plug into popular operating systems and support cloud applications.

Figure 12:
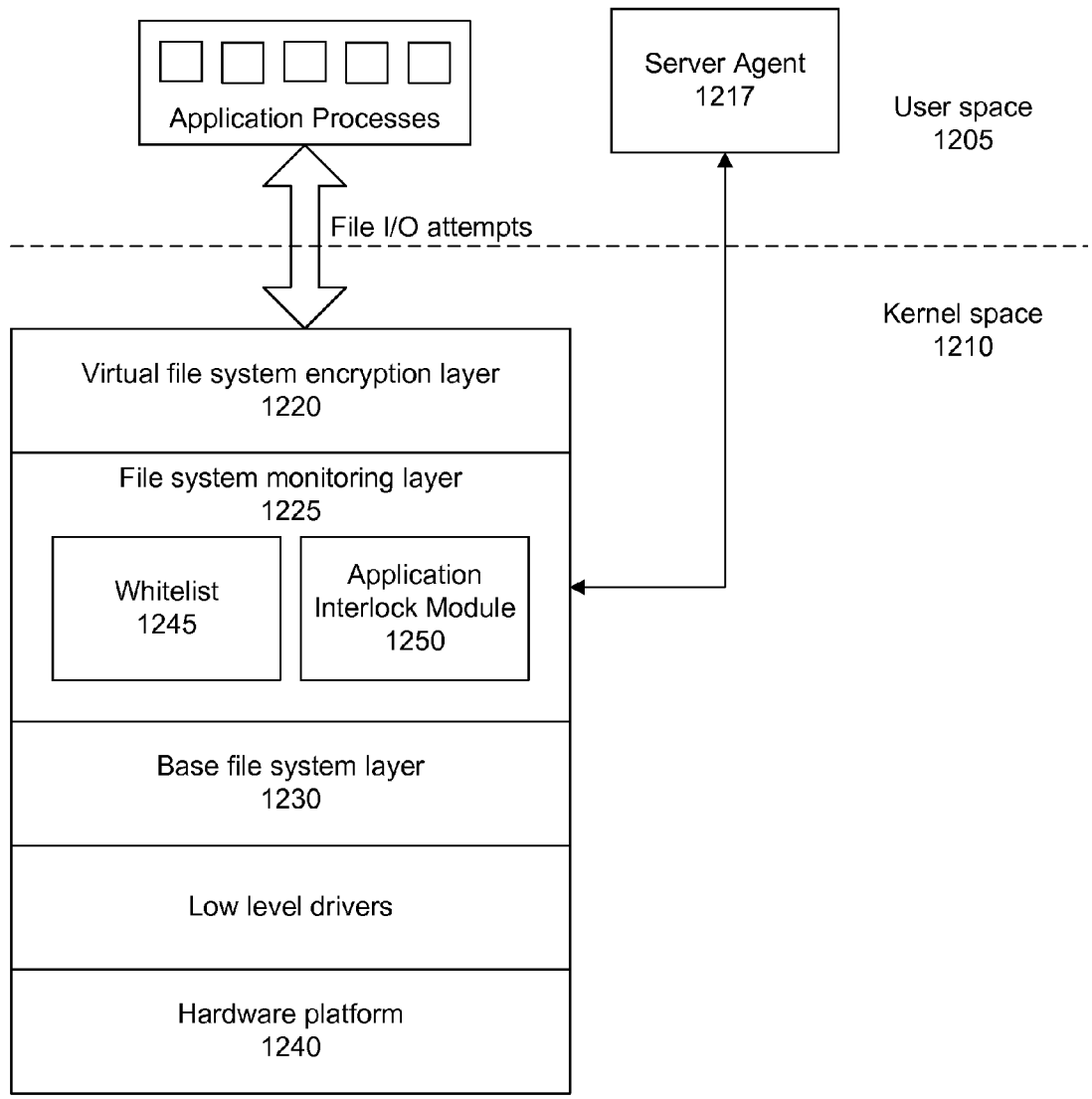
FIG. 12 shows a layered diagram of a file monitoring system that supports interlocking an application and a file.

FIG. 12 shows a layer description of a specific embodiment of the application interlock feature of the system. In this specific embodiment, the application interlock feature is provided to a virtual machine in the cloud domain. As discussed above, data may be transferred from the enterprise to the cloud domain. The application interlock feature helps to ensure that the data in the cloud domain can be accessed only by authorized applications in a confined and secure environment.

As shown in the example of FIG. 12, a computing environment can include a user space 1205 and a kernel space 1210. The user space includes application processes 1215 and a server agent 1217. The kernel space includes a virtual file system (VFS) encryption layer 1220, a file system monitoring layer 1225, a base file system layer 1230, a low-level drivers layer 1235, and a hardware layer 1240. The server agent communicates with the file system monitoring layer to check the application processes against the security policy to determine whether the requesting process should be provided with a decrypted version of the data or should be denied access.

In this embodiment, the layers are hierarchical. In other words, the VFS encryption layer is higher than the file system monitoring layer, which is higher than the base file system layer, which is higher than the low-level driver layer, which is higher than the hardware platform layer. Lower layers generally contain more specific and more physically-related information compared to a higher layer.

The virtual file system encryption layer provides an encrypted file system that allows the storage of encrypted files in a mounted file system. The VFS encryption layer provides a virtual file system for applications such that file operations (e.g., file I/O) pass through the encryption layer. The VFS encryption layer is layered on top of the base level file system layer. A specific example of an encrypted file system layer is eCryptfs as shown in FIG. 11. A specific example of a base level file system is Linux ext 4. It should be appreciated, however, that other types encrypted file systems, low level file systems, or both may be used. Some other examples of lower level file systems that may be suitable include NFS, CIFS, XFS, ReiserFS, JFS, FAT 32—just to name a few examples.

As shown in the example of FIG. 12, the file system monitoring layer is positioned between the VFS encryption layer and the base file system layer. The file system monitoring layer includes a whitelist 1245 and an application interlocker module 1250.

In a specific embodiment, the whitelist stores a listing of identifiers for applications that are allowed to access decrypted versions of files. Applications not listed in the whitelist will receive a denial of service. Instead or additionally, the system may provide an alert or other notification indicating that the application is not authorized to access the encrypted file.

The application interlocker module is responsible for checking the whitelist and, based on the check, instructing the VFS encryption layer to decrypt the encrypted file for the application, thereby providing the application with a decrypted version or format of the file or informing the VFS encryption layer of a denial of service, thereby protecting the encrypted file and blocking access.

Figure 13:
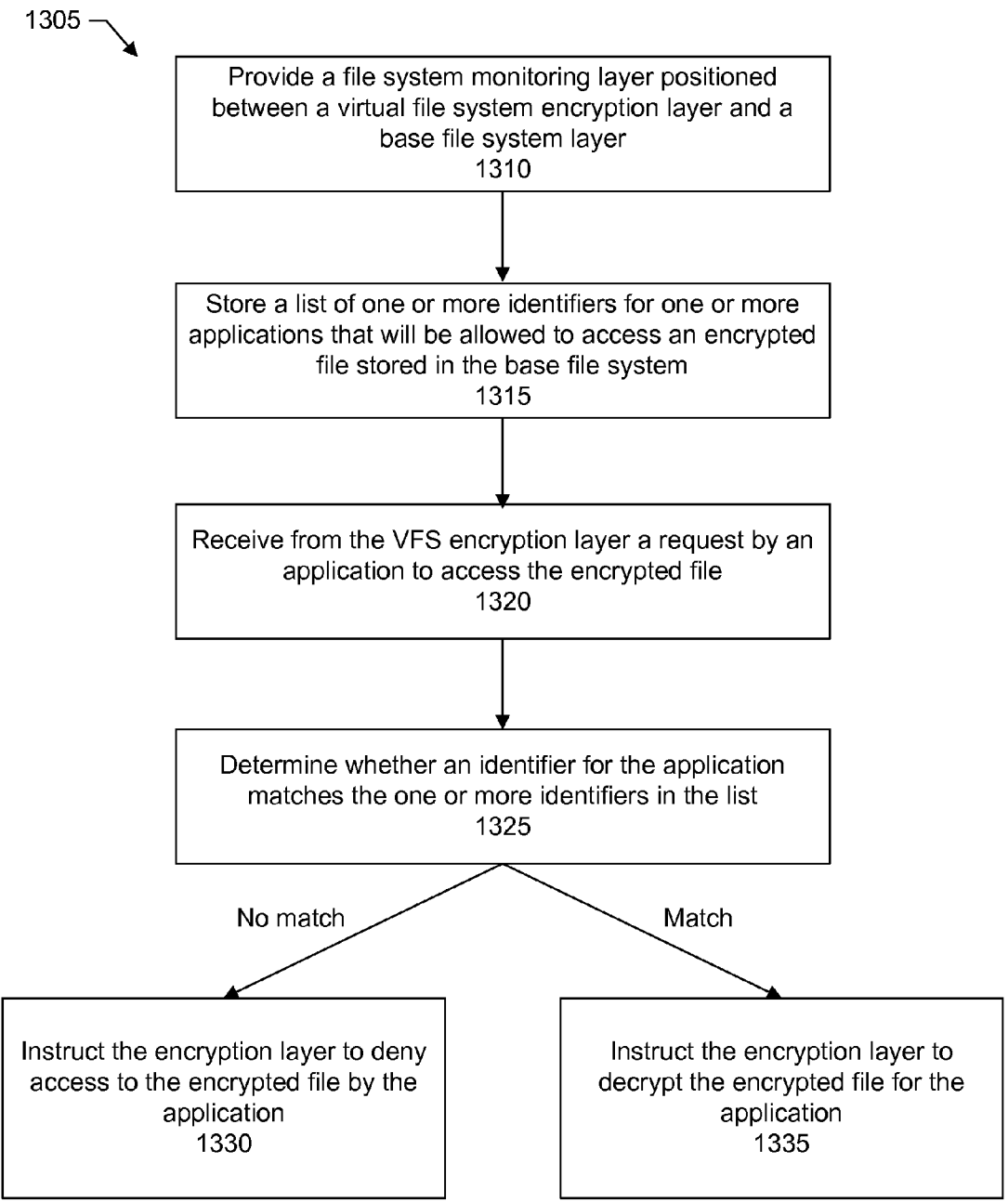
FIG. 13 shows a flow diagram for interlocking an application and a file.

FIG. 13 shows an overall flow 1305 of the application interlock feature. In a step 1310 a file system monitoring layer is provided that is positioned between a virtual file system encryption layer and a base file system layer.

In a step 1315, the monitoring file system stores a list of one or more identifiers corresponding to one or more applications that will be allowed to access an encrypted file stored in the file system. In a specific embodiment, an identifier includes a checksum associated with the application. It should be appreciated, however, that any type of identifier that uniquely identifies an application may instead or additionally be used.

In a step 1320, the monitoring file system receives from the encryption layer a request by an application to access an encrypted file stored in the base or lower level file system.

In a step 1325, the monitoring file system scans the list of authorized applications to determine whether an identifier for the application matches an identifier in the list. If there is no match, in a step 1330, the system instructs the encryption layer to provide a denial of service to the application. Alternatively, if there is a match, in a step 1335, the system instructs the encryption layer to decrypt the encrypted file for the application.

A benefit of the application interlock feature is that it allows enterprises to create customized versions of applications authorized to access an encrypted file. For example, in some cases, an enterprise may wish to disable certain features of an application for reasons related to security, performance, or both. An identifier (e.g. checksum) corresponding to the customized version of the application can be calculated and saved in the whitelist.

When an application attempts to access an encrypted file, the system can calculate or otherwise obtain an identifier corresponding to the application to determine whether the application is authorized to access the file. If the application is not authorized (e.g., the identifier is not listed in the whitelist) the application will receive a denial of service for the access. If the application is authorized (e.g. the identifier is listed in the whitelist), the application is provided with the decrypted version of the file. In another specific embodiment, a blacklist may be stored that identifies the applications not allowed to access the file. In this specific embodiment, applications not on the blacklist are allowed to access the file.

In a specific embodiment, the file is a data file. In another specific embodiment, the file is an executable file or includes executable code. In this specific embodiment, the application attempting to access the executable file may be referred to as an executor or starter. When the starter is listed as the only application that can access (e.g. execute) the executable file (e.g., the application software), the executable file is then protected and is executable only under the protection of the interlock system. The executable may be designed such that it can be executed only by the corresponding starter.

The system can help to discourage software piracy because an encrypted file (e.g. data file or executable file) will not be able to be accessed outside of the system or in another system not having the application interlock module. Since the File System Monitoring Layer 1225 is connected to the server agent 1217 which is then connected to the central management system 410, this protection can easily apply to a specific cloud service, public or private or hybrid. A cloud service identifier (e.g. domain name and public IP address) can be easily identified and verified by the service agent, along with the verification of the application against the whitelist, as the total check to qualify the access to the encrypted data.

In a specific embodiment, an identifier associated with a particular cloud service is stored. In this specific embodiment, determining whether an encrypted file stored in a cloud service can be accessed includes determining whether an identifier for the cloud service matches the identifier associated with the particular cloud service. If the cloud service identifiers match, the file may be decrypted. If the cloud service identifiers do not match, the file may not be decrypted. Checking whether the cloud service identifiers match may be performed before, during, or after checking whether the application identifiers match the application whitelist. In another specific embodiment, a black list of cloud services is stored. The blacklist identifies cloud services in which a file will not be allowed to be accessed if it is in the blacklisted cloud service.

In a modern enterprise public or hybrid cloud environment, securely transferring data to and from the cloud and protecting the data in the cloud is never easy. Facing an elastic cloud, the needed system has to run as an integral part of the hybrid cloud infrastructure and be elastic with the cloud. To kludge a system for doing so can be manually expensive, very disruptive to enterprise existing environment, and potentially vulnerable for data loss.

The secure data transfer platform described in this patent application solves these challenges without compromising enterprise security and compliance requirements. In a specific embodiment, this platform is designed to operate as part of the enterprise hybrid cloud. The data transfer platform is able to synchronize the files at change into the cloud and back up the revised files or newly generated files out of the cloud, automatically. The data are always protected on the move and at rest in the cloud.

In a specific embodiment, the system provides a novel technology referred to as application interlock to further lock the data with the targeted applications that will run in the cloud. With this cutting edge technology, enterprises never have to worry about losing data in the cloud.

A cloud storage system with a "drop box" like function can be desirable in today's computing market. However, the currently available technology in market does not address the needs for data transfer and protection in an enterprise hybrid cloud environment.

The system as described in this patent application addresses all critical needs in this space with automation, elastic computing, and advanced data security and protection capabilities.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A computer-implemented method comprising:
   storing, on a storage device, a list comprising one or more identifiers for one or more applications that will be allowed to access an encrypted file, wherein the list identifies a specific version of a particular application that will be allowed to access the encrypted file;
   receiving from a virtual file system encryption layer a request by an application to access the encrypted file;
   determining, by a computer processor, whether an identifier for the application matches the one or more identifiers in the list;
   if the identifier does match, instructing the virtual file system encryption layer to decrypt the encrypted file for the application;
   receiving a request from a different version of the particular application to access the encrypted file; and
   denying the different version of the particular application access to the encrypted file because the different version of the particular application is not the specific version of the particular application that is allowed to access the encrypted file, the different version of the particular application thereby not being listed in the list.

2. The method of claim 1 comprising:
   if the identifier does not match, instructing the virtual file system encryption layer to provide a denial of service to the application.

3. The method of claim 1 wherein the application is executing in a layer above the virtual file system encryption layer.

4. The method of claim 1 wherein the encrypted file is stored on a virtual disk.

5. The method of claim 1 wherein the one or more identifiers comprise a checksum.

6. The method of claim 1 wherein the encrypted file comprises an executable file.

7. The method of claim 1 wherein the encrypted file comprises a data file.

8. A computer-implemented method comprising:
providing, on a computer system, a file system monitoring layer between a virtual file system encryption layer and a base file system layer, the file system monitoring layer comprising a list identifying computer programs that will be allowed to access encrypted data stored in the base file system layer, wherein the list identifies a specific version of a particular computer program that will be allowed to access the encrypted data;
receiving from the virtual file system encryption layer a request by a computer program to access the encrypted data;
determining, by a computer processor, whether the computer program is listed in the list;
if the computer program is listed, instructing the virtual file system encryption layer to decrypt the data for the computer program;
receiving from the virtual file system encryption layer a request by a different version of the particular computer program to access the encrypted data; and
denying the different version of the particular computer program access to the encrypted data because the different version of the particular computer program is not the specific version of the particular computer program that is allowed to access the encrypted data, the different version of the particular computer program thereby not being listed in the list.

9. The method of claim 8 comprising:
if the computer program is not listed, instructing the virtual file system encryption layer to deny access to the encrypted data.

10. The method of claim 8 wherein the encrypted data comprises an executable file.

11. The method of claim 8 wherein the encrypted data comprises a data file.

12. The method of claim 8 wherein the file system monitoring layer is in a kernel space.

13. The method of claim 8 wherein the computer program comprises application software.

14. The method of claim 8 wherein the computer program comprises system software.

15. A computer-implemented method comprising:
providing, on a computer system, a file system monitoring layer between a virtual file system encryption layer and a base file system layer, the file system monitoring layer comprising a list identifying computer software that will be allowed to access data stored in an encrypted format in the base file system layer, wherein the list identifies a specific version of a particular piece of computer software that will be allowed to access the data stored in the encrypted format;
receiving from the virtual file system encryption layer a request by a piece of computer software to access the data stored in the encrypted format;
determining, by a processor of the computer system, whether the piece of computer software is listed in the list;
if the piece of computer software is listed, instructing the virtual file system encryption layer to decrypt the data;
receiving from the virtual file system encryption layer a request by a different version of the particular piece of computer software to access the data stored in the encrypted format; and
denying the different version of the particular piece of computer software access to the data stored in the encrypted format because the different version of the particular piece of computer software is not the specific version of the particular piece of computer software that is allowed to access the data stored in the encrypted format, the different version of the particular piece of computer software thereby not being listed in the list.

16. The method of claim 15 comprising:
if the piece of computer software is not listed, instructing the virtual file system encryption layer to deny access to the data.

17. The method of claim 15 wherein the data comprises an executable file.

18. The method of claim 15 wherein the data comprises a non-executable file.

19. The method of claim 15 wherein the file system monitoring layer is in a kernel space.

20. The method of claim 15 wherein the data is in a cloud environment provided by a cloud services provider, and the method comprises:
storing an identifier of a particular cloud services provider; and
before the instructing the virtual file system encryption layer to decrypt the data, determining that the identifier of the particular cloud services provider matches an identifier of the cloud services provider.

21. The method of claim 1 comprising:
receiving from the virtual file system encryption layer a request from the specific version of the particular application to access the encrypted file; and
allowing the specific version of the particular application access to the encrypted file.

22. The method of claim 1 wherein the specific version of the particular application comprises an application that has been customized by an enterprise.

23. The method of claim 1 wherein the particular application comprises a feature available to users,
wherein the feature has been disabled to create the specific version of the particular application, and
wherein the feature has not been disabled in the different version of the particular application.

24. The method of claim 1 wherein the denying the different version of the particular application access to the encrypted file comprises not decrypting the encrypted file for the different version of the particular application.

25. The method of claim 8 wherein the denying the different version of the particular computer program access to the encrypted data comprises not decrypting the encrypted data for the different version of the particular computer program.

26. The method of claim 15 wherein the denying the different version of the particular piece of computer software access to the data comprises not decrypting the data for the different version of the particular piece of computer software.

* * * * *